United States Patent
Kiyosawa

(10) Patent No.: US 11,833,686 B2
(45) Date of Patent: Dec. 5, 2023

(54) CONTROL METHOD AND CALCULATION DEVICE

(71) Applicant: Seiko Epson Corporation, Tokyo (JP)

(72) Inventor: Yuki Kiyosawa, Shiojiri (JP)

(73) Assignee: SEIKO EPSON CORPORATION

( * ) Notice: Subject to any disclaimer, the term of this patent is extended or adjusted under 35 U.S.C. 154(b) by 287 days.

(21) Appl. No.: 17/084,838

(22) Filed: Oct. 30, 2020

(65) Prior Publication Data

US 2021/0129322 A1 May 6, 2021

(30) Foreign Application Priority Data

Oct. 31, 2019 (JP) ................................ 2019-198391

(51) Int. Cl.
*B25J 9/16* (2006.01)
*B25J 13/08* (2006.01)

(52) U.S. Cl.
CPC ........... *B25J 9/1633* (2013.01); *B25J 13/085* (2013.01)

(58) Field of Classification Search
CPC ........ B25J 9/1633; B25J 13/085; B25J 5/007; B25J 9/162; B25J 9/1661; B25J 9/1679; B25J 18/00; G05B 2219/40298; G05B 2219/40582; G05B 2219/41015; G05B 2219/41427
See application file for complete search history.

(56) References Cited

U.S. PATENT DOCUMENTS

| | | | | |
|---|---|---|---|---|
| 4,367,532 A | * | 1/1983 | Crum | G05B 19/427 318/568.14 |
| 2009/0016859 A1 | | 1/2009 | Asakawa | |
| 2015/0177084 A1 | * | 6/2015 | Inoue | B25J 9/1676 73/862.541 |
| 2019/0160669 A1 | * | 5/2019 | Xiong | B25J 9/16 |
| 2019/0314986 A1 | * | 10/2019 | Ohashi | B25J 9/1638 |
| 2021/0121343 A1 | * | 4/2021 | Lonner | B25J 13/086 |
| 2021/0362336 A1 | * | 11/2021 | Muneto | B25J 9/1694 |
| 2022/0097230 A1 | * | 3/2022 | Kawabe | B25J 13/088 |

FOREIGN PATENT DOCUMENTS

| | | |
|---|---|---|
| JP | H01-141327 A | 6/1989 |
| JP | 2017-074631 A | 4/2017 |
| WO | 2006-046580 A1 | 5/2006 |

* cited by examiner

*Primary Examiner* — Abby Y Lin
*Assistant Examiner* — Danielle Marie Jackson
(74) *Attorney, Agent, or Firm* — Harness, Dickey & Pierce, P.L.C.

(57) ABSTRACT

A control method includes an input step for inputting information concerning a setting angle for a robot arm of a robot, the robot including the robot arm including an arm and a driving section including a servomotor that drives the arm, a calculating step for calculating, based on a first servo parameter corresponding to setting at a first setting angle for the robot arm and a second servo parameter corresponding to setting at a second setting angle different from the first setting angle for the robot arm, a third servo parameter corresponding to the setting angle for the robot arm.

9 Claims, 8 Drawing Sheets

US 11,833,686 B2

CONTROL METHOD AND CALCULATION DEVICE

The present application is based on, and claims priority from JP Application Serial Number 2019-198391, filed Oct. 31, 2019, the disclosure of which is hereby incorporated by reference herein in its entirety.

BACKGROUND

1. Technical Field

The present disclosure relates to a control method and a calculation device.

2. Related Art

In recent years, automation of work manually performed in factories has been accelerated by various robots and peripheral devices of the robots because of a hike in personnel expenses and labor shortage. For example, JP-A-2017-74631 (Patent Literature 1) discloses a production system including a workbench on which a work target object is disposed and a robot provided on a side of the workbench.

The robot described in Patent Literature 1 is disposed on a truck. A robot arm performs work for assembling and machining the work target object from above the truck.

For example, depending on the height of the truck or the height of the workbench, it could occur that the robot arm cannot reach the work target object on the workbench. In order to solve such a problem, it is conceivable to set the robot in an inclined state.

However, in the past, servo parameters are set assuming that the robot is set on a horizontal plane and used. Therefore, the servo parameters are not optimum values in a state in which the robot is inclined. As a result, driving performance of the robot arm is deteriorated.

SUMMARY

A control method according to an application example includes: an input step for inputting information concerning a setting angle for a robot arm of a robot, the robot including the robot arm including an arm and a driving section including a servomotor that drives the arm; and a calculating step for calculating, based on a first servo parameter corresponding to setting at a first setting angle for the robot arm and a second servo parameter corresponding to setting at a second setting angle different from the first setting angle for the robot arm, a third servo parameter corresponding to the setting angle for the robot arm.

A calculation device according to an application example includes: an input section configured to input information concerning a setting angle for a robot arm of a robot, the robot including the robot arm including an arm and a driving section including a servomotor that drives the arm; and a calculating section configured to calculate, based on a first servo parameter corresponding to setting at a first setting angle for the robot arm and a second servo parameter corresponding to setting at a second setting angle different from the first setting angle for the robot arm, a third servo parameter corresponding to the setting angle for the robot arm.

A calculation device according to an application example includes: an input section configured to input information concerning a setting angle for a robot arm of a robot, the robot including the robot arm including an arm, a driving section including a servomotor that drives the arm, and a force detecting section configured to detect force applied to the robot arm; and a calculating section configured to calculate, according to an input result of the input section, at least one of a servo parameter used in driving the servomotor and a force detection parameter used for correction of a detection value of the force detecting section.

DESCRIPTION OF EXEMPLARY EMBODIMENTS

Control methods and calculation devices according to preferred embodiments of the present disclosure are explained in detail below.

First Embodiment

Figure 1:
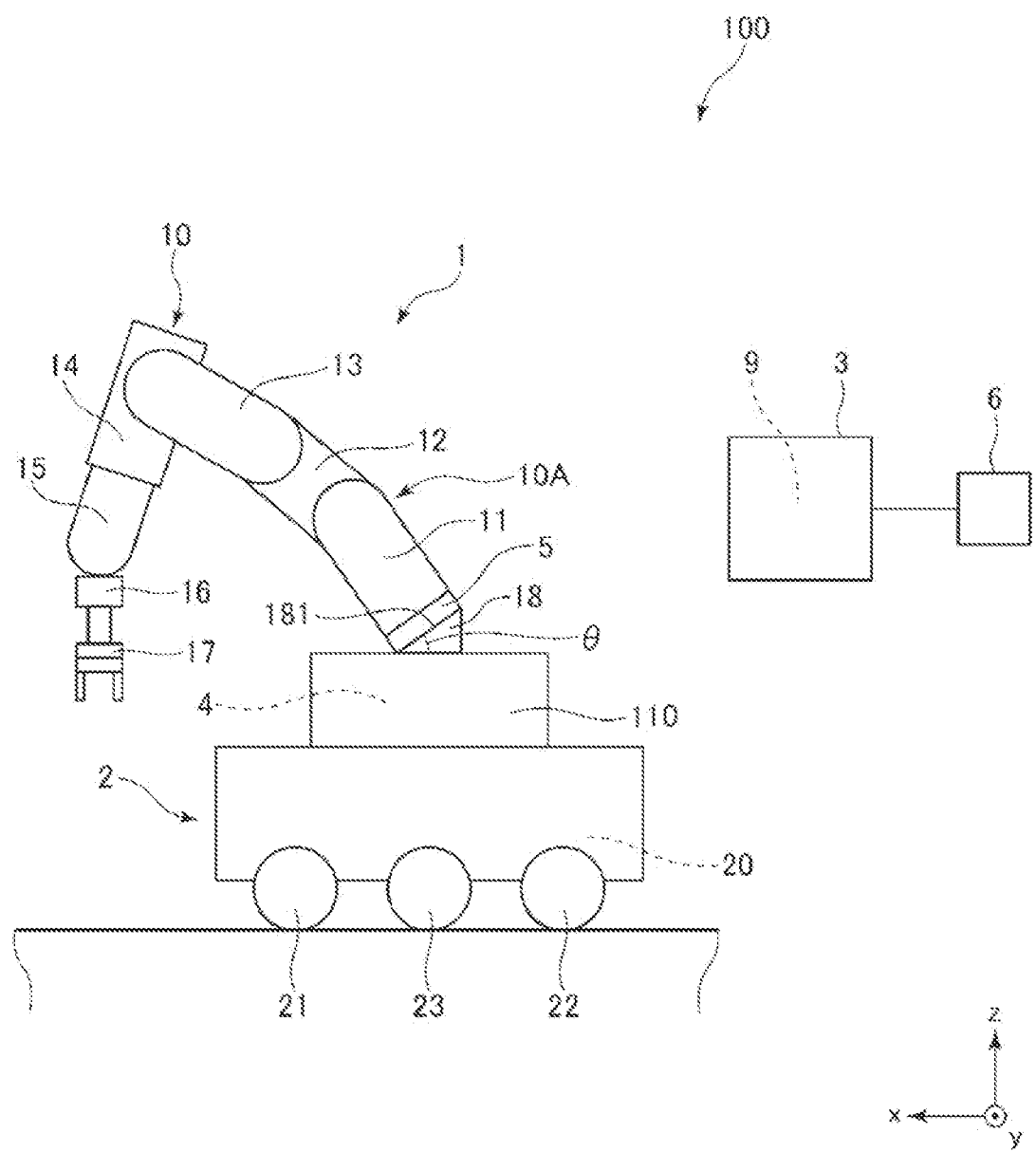
FIG. 1 is a side view showing a robot system including a calculation device according to a first embodiment of the present disclosure.
Figure 2:
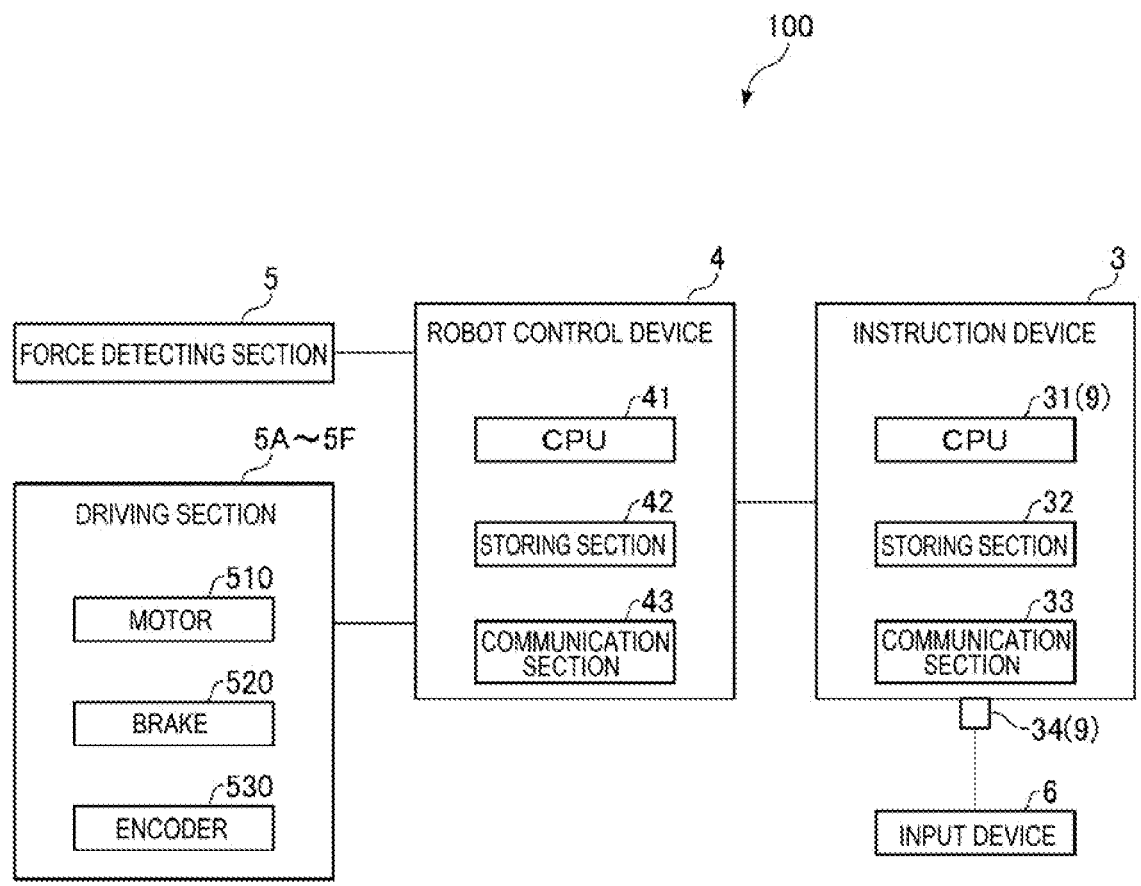
FIG. 2 is a block diagram of the robot system shown in FIG. 1.
Figure 3:
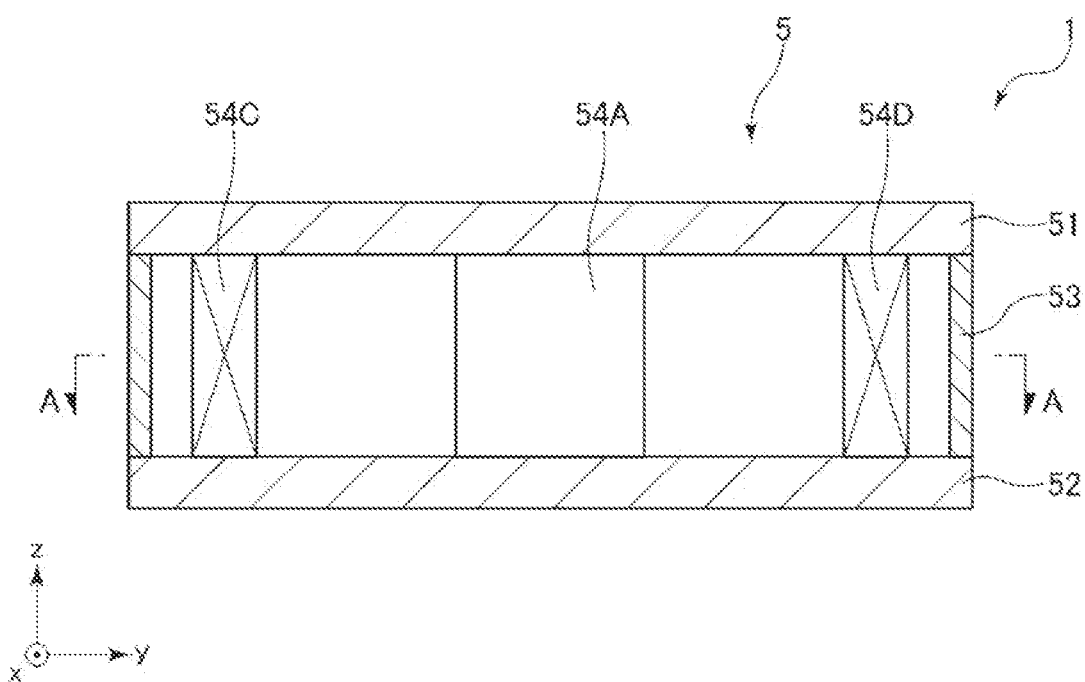
FIG. 3 is a longitudinal sectional view of a force detecting section shown in FIG. 1.
Figure 4:
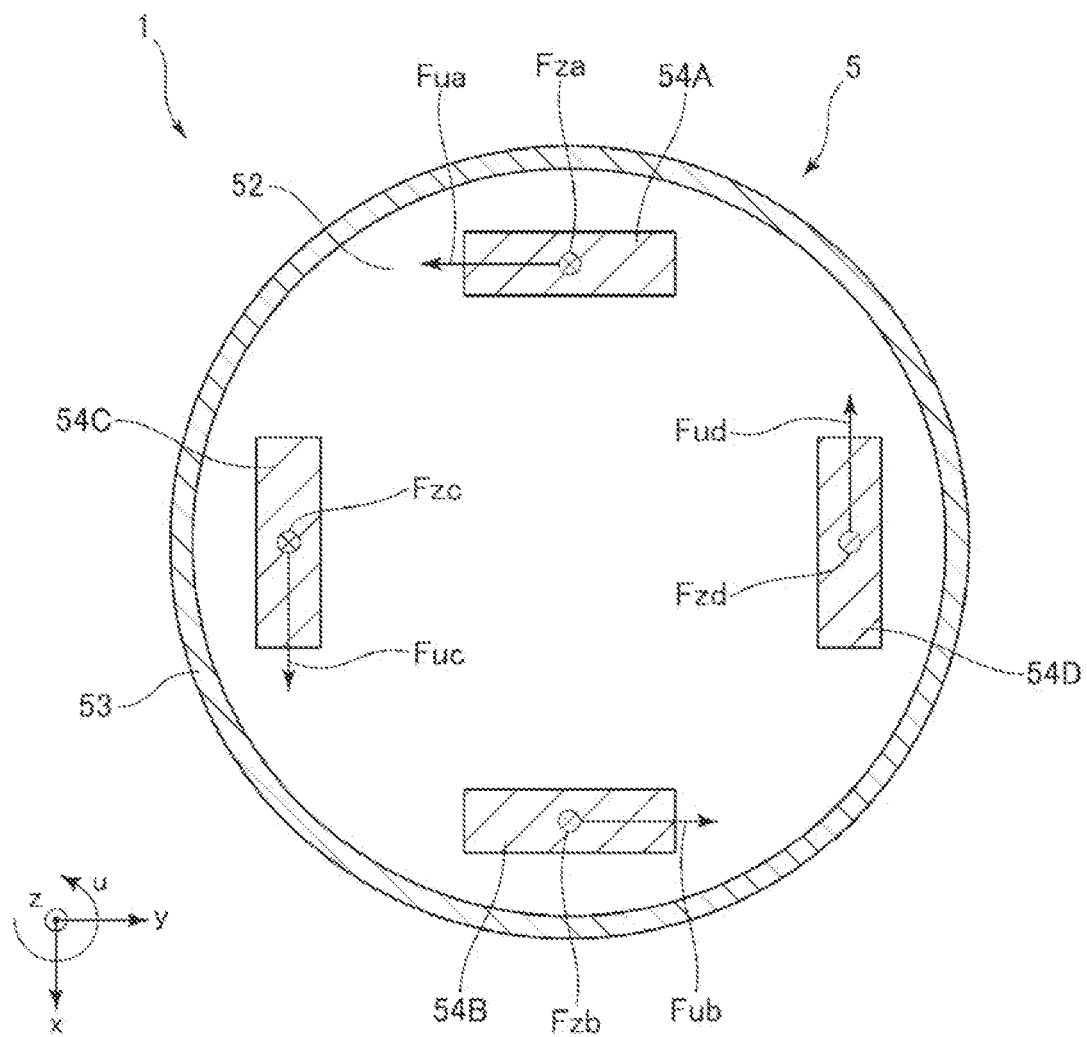
FIG. 4 is an A-A line sectional view in FIG. 3.
Figure 5:
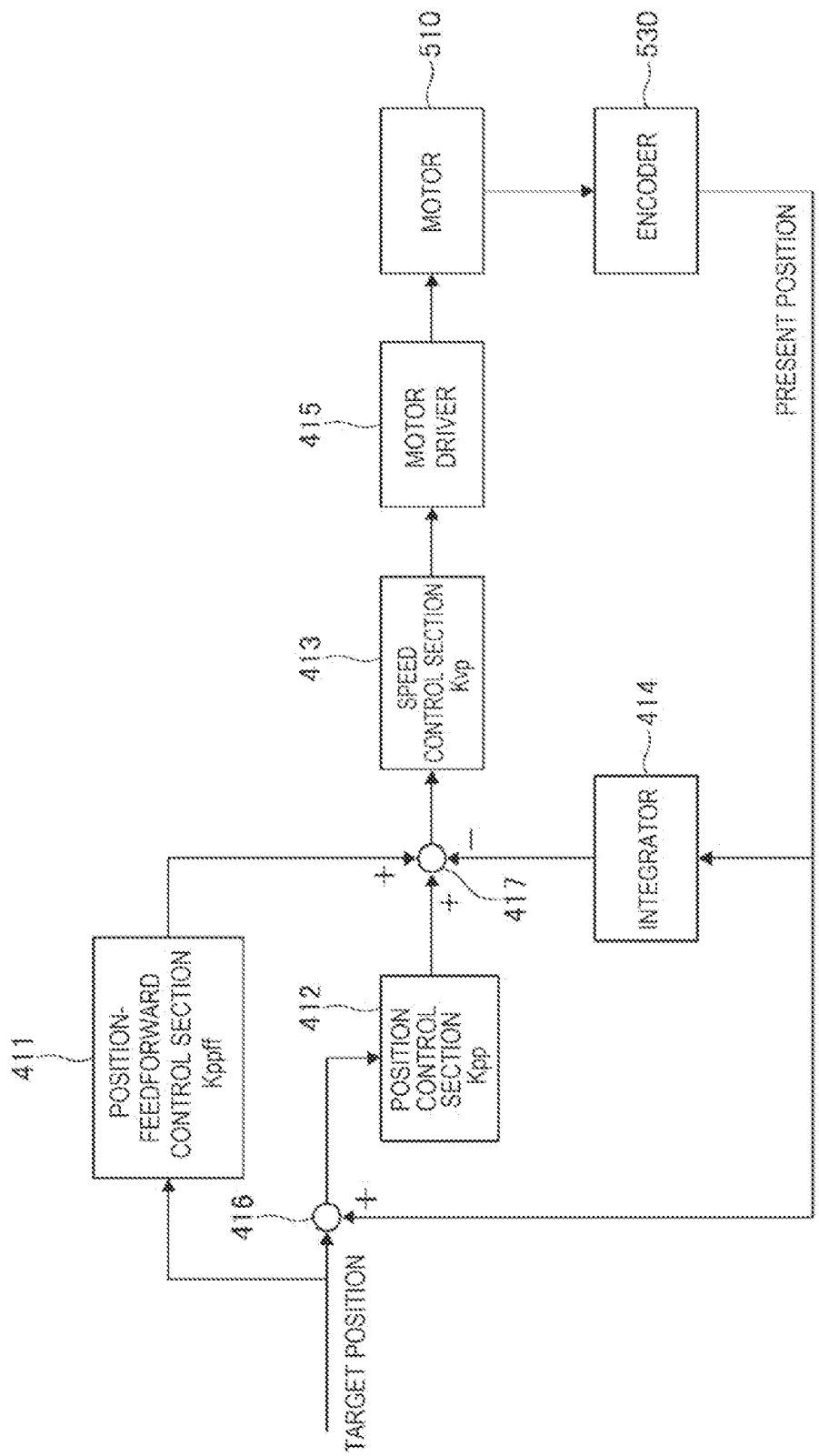
FIG. 5 is a control block diagram showing main parts of a robot and a robot control device shown in FIG. 1.
Figure 6:
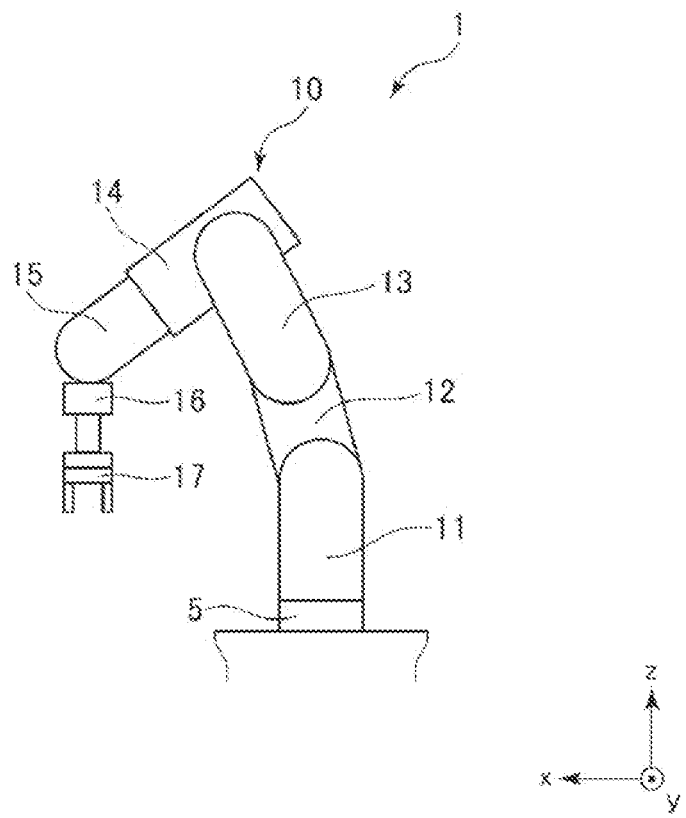
FIG. 6 is a side view showing a robot main body set at a first setting angle.
Figure 7:
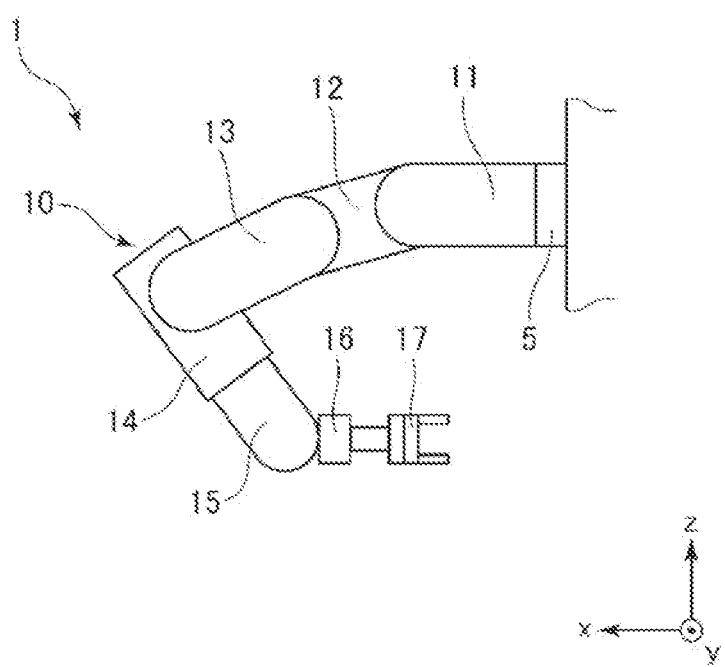
FIG. 7 is a side view showing the robot main body set at a second setting angle.
Figure 8:
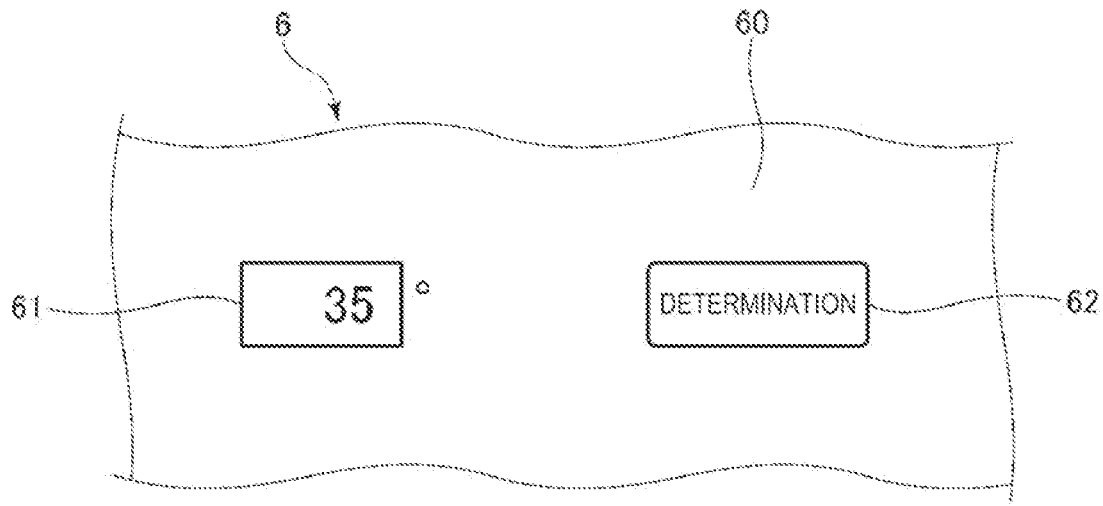
FIG. 8 is a partially enlarged view of a display screen of an input device shown in FIG. 1.
Figure 9:
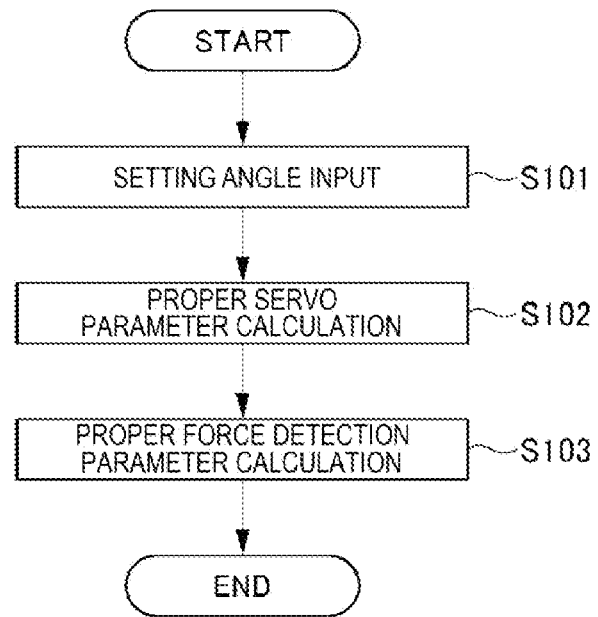
FIG. 9 is a flowchart for explaining a control operation performed by a calculation device shown in FIG. 1.

FIG. 1 is a side view showing a robot system including a calculation device according to a first embodiment of the present disclosure. FIG. 2 is a block diagram of the robot system shown in FIG. 1. FIG. 3 is a longitudinal sectional view of a force detecting section shown in FIG. 1. FIG. 4 is an A-A line sectional view in FIG. 3. FIG. 5 is a control block diagram showing main parts of a robot and a robot control device shown in FIG. 1. FIG. 6 is a side view showing a robot main body set at a first setting angle. FIG. 7 is a side view showing the robot main body set at a second setting angle. FIG. 8 is a partially enlarged view of a display screen of an input device shown in FIG. 1. FIG. 9 is a flowchart for explaining a control operation performed by a calculation device shown in FIG. 1.

In FIGS. 1, 6, and 7, for convenience of explanation, an x axis, a y axis, and a z axis are illustrated as three axes orthogonal to one another. In the following explanation, a direction parallel to the x axis is referred to as "x-axis direction" as well, a direction parallel to the y axis is referred to as "y-axis direction" as well, and a direction parallel to the z axis is referred to as "z-axis direction" as well.

In the following explanation, a distal end side of illustrated arrows is referred to as "+ (plus)" or "positive" and a proximal end side of the arrows is referred to as "− (minus)" or "negative". For convenience of explanation, a +z-axis direction, that is, an upper side is referred to as "upper" or "upward" as well and a −z-axis direction, that is, a lower side is referred to as "lower" or "downward" as well. The z-axis direction in FIG. 1, that is, an up-down direction is set as a "vertical direction" and the x-axis direction and the y-axis direction, that is, a left-right direction is set as a "horizontal direction".

A robot system 100 shown in FIG. 1 is used in, for example, work such as holding, conveyance, assembly, and inspection of work such as an electronic component and an electronic device.

The robot system 100 shown in FIGS. 1 and 2 is, for example, a device used in work such as holing, conveyance, assembly, and inspection of work such an electronic component and an electronic device. The robot system 100 includes a robot 1, a robot control device 4, a mobile body 2, an instruction device 3 that instructs the robot 1 about an operation program, and an input device 6. The robot 1 and the instruction device 3 are communicable by wire or radio. The communication of the robot 1 and the instruction device 3 may be performed via a network such as the Internet.

As explained below, a calculation device 9 is configured by a CPU 31 and an input section 34 of the instruction device 3.

The robot 1 shown in FIG. 1 is a so-called six-axis vertical articulated robot and includes a base 110, a robot arm 10 coupled to the base 110, a force detecting section 5, and an inclined member 18.

The base 110 supports the robot arm 10. The base 110 includes a housing. For example, a driving device that drives the robot arm 10 and a robot control device 4 are incorporated in the inside of the housing. The robot control device 4 may be disposed on the outer side of the base 110.

The proximal end of the robot arm 10 shown in FIG. 1 is coupled to the force detecting section 5. The robot arm 10 includes a plurality of arms, that is, an arm 11, an arm 12, an arm 13, an arm 14, an arm 15, and an arm 16. The arms 11 to 16 are coupled in this order from the proximal end toward the distal end of the robot arm 10. The arms 11 to 16 are turnable with respect to the arms adjacent thereto or the base 110.

As shown in FIGS. 1 and 2, the robot 1 includes a driving section 5A that turns the arm 11 with respect to the base 110, a driving section 5B that turns the arm 12 with respect to the arm 11, a driving section 5C that turns the arm 13 with respect to the arm 12, a driving section 5D that turns the arm 14 with respect to the arm 13, a driving section 5E that turns the arm 15 with respect to the arm 14, and a driving section 5F that turns the arm 16 with respect to the arm 15. As shown in FIG. 2, the driving sections 5A to 5F include motors 510, which are servomotors, not-shown motor drivers that control driving of the motors 510, brakes 520 that switch a lock state and an unlock state of the motors 510, and encoders 530 that detect rotation amounts of the motors 510. The motors 510, the motor drivers, the brakes 520, and the encoders 530 are controlled independently from one another by the robot control device 4.

As shown in FIG. 1, an end effector 17 that holds a work target object is attached to the distal end of the robot arm 10. In the illustrated configuration, the end effector 17 brings a plurality of, for example, two fingers close to each other and separates the fingers from each other to grip the work target object. The end effector 17 is not limited to this configuration and may be, for example, a tool such as a suction hand, a magnetic hand, or a drill.

The inclined member 18 is provided between the base 110 and the force detecting section 5. The inclined member 18 includes an inclined surface 181. The inclined member 18 is set on the base 110 such that the inclined surface 181 is set in a direction inclined with resect to an x-y plane. The proximal end of the robot arm 10 is fixed to the inclined surface 181. In other words, in the robot 1 shown in FIG. 1, the inclined surface 181 is a setting surface for a robot main body 10A configured by the robot arm 10 and the force detecting section 5.

An operator may select, as appropriate, according to an environment of use, the inclined member 18 out of a plurality of inclined members 18 having inclined angles of the inclined surfaces 181 different from one another and set the inclined member 18. For example, the inclined member 18 may be set between the base 110 and the mobile body 2.

As shown in FIGS. 3 and 4, the force detecting section 5 is a member including a first plate 51, a second plate 52, a tubular section 53 disposed between the first plate 51 and the second plate 52, an element 54A, an element 54B, an element 54C, and an element 54D and having an external shape formed in a columnar shape. The elements 54A to 54D are held between the first plate 51 and the second plate 52. The number of elements is not limited to four and may be three or less or may be five or more.

The first plate 51 and the second plate 52 are formed in a disk shape and disposed to be separated from the +z-axis side in this order. A shape in a plan view of the first plate 51 and the second plate 52 is not limited to a circular shape and may be any shape.

In this embodiment, the tubular section 53 is formed in a cylindrical shape and has a function of protecting the elements 54A to 54D.

The elements 54A to 54D are disposed at equal intervals to form a circle. Consequently, force applied to the elements 54A to 54D becomes uniform as much as possible. The force can be accurately detected.

As the elements 54A to 54D, an element that is configured by a piezoelectric body such as quartz and outputs electric charges when receiving external force can be used. As shown in FIG. 4, the element 54A is located on the −x-axis side, the element 54B is located on the +x-axis side, the element 54C is located on the −y-axis side, and the element 54D is located on the +y-axis side.

As shown in FIG. 4, in this embodiment, the elements 54A to 54D output electric charges when receiving force Fz of a component in the vertical direction and force Fu around the z-axis direction, that is, in a u-axis direction. Information concerning the electric charges output by the elements 54A to 54D is transmitted to the robot control device 4. The robot control device 4 converts, according to the information concerning the electric charges, the force Fz and the force Fu into force received by the force detecting section 5. The robot control device 4 can convert the force Fz and the force Fu into external force received by the robot arm 10. This is explained below.

The mobile body 2 is explained.

The mobile body 2 shown in FIG. 1 is configured by an automatic traveling system and includes a moving mechanism 20 for moving the base 110. The moving mechanism 20 includes a plurality of wheels, that is, a pair of front wheels 21 arranged side by side in the y-axis direction in FIG. 1, a pair of rear wheels 22 arranged side by side in the y-axis direction in FIG. 1, and a pair of driving wheels 23 arranged side by side in the y-axis direction in FIG. 1. The pair of driving wheels 23 are provided between the pair of front wheels 21 and the pair of rear wheels 22. The driving wheels 23 are coupled to a not-shown driving section and rotate with a driving force from the driving section and move the base 110. In this embodiment, the pair of front wheels 21 and the pair of rear wheels 22 are driven wheels.

The driving wheels 23 are respectively independently coupled to the driving sections and are each configured to be capable of regularly rotating and reversely rotating. Accordingly, the driving wheels 23 can move straight forward and retract. By adjusting at least one of rotating speed and a rotating direction of the driving wheels 23, it is possible to perform steering, for example, change a traveling direction. In this embodiment, the front wheels 21, the rear wheels 22, and the driving wheels 23 are configured not to rotate around the z axis but are not limited to this. At least one of the front wheels 21, the rear wheels 22, and the driving wheels 23 may be configured to rotate around the z axis. In this case, it is possible to perform steering by adjusting a rotation amount around the z axis.

"Movement" in this specification includes not only straight forward movement, curving, meandering, reciprocation, and the like but also rotation. The number of wheels of the moving mechanism 20 is not particularly limited. The configuration of the moving mechanism 20 is not limited to the wheel traveling type explained above and may be, for example, a mechanism that includes a plurality of legs and walks.

The robot control device 4 is explained.

As shown in FIG. 2, the robot control device 4 has a function of controlling the operation of the robot arm 10 and includes a CPU (Central Processing Unit) 41, a storing section 42, and a communication section 43.

The CPU 41 reads out and executes various programs and the like stored in the storing section 42. An instruction signal generated by the CPU 41 is transmitted to the robot 1 via the communication section 43. Consequently, the robot arm 10 can execute predetermined work.

The storing section 42 saves various programs and the like executable by the CPU 41. Examples of the storing section 42 include a volatile memory such as a RAM (Random Access Memory), a nonvolatile memory such as a ROM (Read Only Memory), and a detachable external storage device.

The communication section 43 performs transmission and reception of signals respectively between the communication section 43 and the robot 1 and the instruction device 3 using an external interface such as a wired LAN (Local Area Network) or a wireless LAN.

The CPU 41 respectively calculates, according to information concerning electric charges output by the elements 54A to 54D shown in FIG. 4, forces received by the elements 54A to 54D. The CPU 41 calculates force received by the force detecting section 5. The force received by the force detecting section 5 includes components in the x-axis direction, the y-axis direction, and the z-axis direction. These forces Fx, Fy, and Fz are calculated as explained below.

The force Fx can be calculated by multiplexing, by a force detection parameter Mx, a value obtained by subtracting force Fub in a u direction received by the element 54B from force Fua in the u direction received by the element 54A. That is, the CPU 41 calculates Fx=(Fua−Fub)×Mx.

The force Fy can be calculated by multiplexing, by a force detection parameter My, a value obtained by subtracting force Fud in the u direction received by the element 54D from force Fuc in the u direction received by the element 54C. That is, the CPU 41 calculates Fy=(Fuc−Fud)×My.

The force Fz can be calculated by multiplexing, by a force detection parameter Mz, a difference between a value obtained by subtracting force Fzb in the z direction received by the element 54B from force Fza in the z direction received by the element 54A and a value obtained by subtracting force Fzd in the z direction received by the element 54D from force Fzc in the z direction received by the element 54C. That is, the CPU 41 calculates Fz{(Fza−Fzb)−(Fzc−Fzd)}×Mz.

The force detection parameter Mx, the force direction parameter My, and the force detection parameter Mz are coefficients used for offsetting and reducing the influence of the gravity in force detection and are values instructed by the instruction device 3. This is explained below.

The robot control device 4 may be configured to control the operation of the mobile body 2. A control device that controls the operation of the mobile body 2 may be separately provided.

Other components may be further added to the robot control device 4 in addition to the components explained above. The various programs, data, and the like saved in the storing section 42 may be stored in the storing section 42 in advance, may be stored in a recording medium such as a CD-ROM and provided from the recording medium, or may be provided via a network or the like.

A control block diagram of the robot 1 is explained.

As shown in FIG. 5, the robot 1 includes a position-feedforward control section 411, a position control section 412, a speed control section 413, an integrator 414, a motor driver 415, an adder-subtractor 416, and an adder-subtractor 417. The position-feedforward control section 411, the position control section 412, and the speed control section 413 are included in the CPU 41.

A signal of a target position input from the instruction device 3 explained below is input to each of the position-feedforward control section 411 and the adder-subtractor 416. The position-feedforward control section 411 multiplies the signal of the target position by a position feedforward gain Kppff, which is a servo parameter, and outputs the signal of the target position to the adder-subtractor 417.

On the other hand, in the adder-subtractor 416, a signal concerning a present position, which is a detection result of the encoder 530, is added to the signal of the target position input to the adder-subtractor 416. The signal of the target position is output to the position control section 412. The position control section 412 multiplies the input signal by a position control gain Kpp, which is a servo parameter, and outputs the signal to the adder-subtractor 417.

The adder-subtractor 417 adds up the signal of the target position multiplied by the position feedforward gain Kppff and the signal of the target position multiplied by the position control gain Kpp and subtracts the signal concerning the present position integrated by the integrator 414 from the added-up signal and inputs a signal obtained by the subtraction to the speed control section 413.

The speed control section 413 multiplies the input signal by a speed control gain Kvp, which is a servo parameter, to convert the signal into speed information or an electric current and outputs the speed information or the electric current to the motor driver 415. Consequently, it is possible to drive, while taking into account the present position of the robot arm 10, the motor 510 to move the robot arm 10 to the target position.

The "servo parameter" in this specification includes the position feedforward gain Kppff, the position control gain Kpp, and the speed control gain Kvp and is a general term of these gains.

The instruction device 3 is explained.

As shown in FIG. 2, the instruction device 3 has a function of controlling the operation of the robot arm 10. The instruction device 3 includes, as shown in FIG. 2, a CPU (Central Processing Unit) 31, a storing section 32, a communication section 33, and an input section 34.

The CPU 31 reads out and executes various programs and the like stored in the storing section 32. An instruction signal generated by the CPU 31 is transmitted to the robot control device 4 via the communication section 33. Consequently, the robot arm 10 can execute predetermined work under predetermined conditions. The CPU 31 is a calculating section that calculates a proper servo parameter, which is a third servo parameter, and a proper force detection parameter. The CPU 31 performs a calculating step explained below.

The storing section 32 saves various programs and the like executable by the CPU 41. Examples of the storing section 32 include a volatile memory such as a RAM (Radom Access Memory), a nonvolatile memory such as a ROM (Random Access Memory), and a detachable external storage device.

The communication section 33 performs transmission and reception of signals between the communication section 33 and the robot control device 4 using an external interface such as a wired LAN (Local Area Network) or a wireless LAN.

Other components may be further added to the instruction device 3 in addition to the components explained above. The various programs, data, and the like saved in the storing section 32 may be stored in the storing section 32 in advance, may be stored in a recording medium such as a CD-ROM and provided from the recording medium, or may be provided via a network or the like.

The robot control device 4 includes a terminal, that is, an input port to which an instruction from the input device 6 is input. This part functions as the input section 34 to which various kinds of information are input. The input section 34 inputs the information, which is input from the input device 6, to, that is, takes the information into the instruction device 3, whereby an input step explained below is performed.

The calculation device 9 is configured by the CPU 31 and the input section 34 of the instruction device 3.

The input device 6 is a device with which the operator inputs information and performs various settings on the instruction device 3. The input device 6 is not particularly limited. Examples of the input device 6 include a tablet, a personal computer, a smartphone, and a teaching pendant. Connection of the input device 6 may be connection by radio besides connection by wire and may be connection by communication via a network such as the Internet.

In this embodiment, as an example, the input device 6 is a device including a display screen 60 as shown in FIG. 8. Examples of a screen displayed on the display screen 60 include a screen including a setting-angle input section 61 and a determination button 62. The operator can touch or operate, with a mouse, the setting-angle input section 61 and the determination button 62.

The configuration of the robot system 100 is explained.

When the proximal end face of the robot arm 10 is set in an inclined state with respect to the horizontal direction by the inclined member 18 as shown in FIG. 1, a movable range of the distal end of the end effector 17 expands to the −z-axis side compared with when the proximal end face of the robot arm 10 is set in a parallel state in the horizontal direction.

In general, a servo parameter in controlling the operation of the robot arm 10 is set assuming that the proximal end face of the robot arm 10 is set in the parallel state in the horizontal direction, as shown in FIG. 6. Accordingly, in the state shown in FIG. 6, when the operation of the robot arm 10 is controlled using the set servo parameter, position accuracy and responsiveness are high and excellent performance can be exerted.

However, when an optimum, that is, proper servo parameter in the state shown in FIG. 6 and the state shown in FIG. 7 is used for control of the operation of the robot arm 10 in the state shown in FIG. 1, the servo parameter is not proper and performance is deteriorated. In view of such facts, in the present disclosure, the problem can be solved as explained below. A control operation of the instruction device 3 is explained below with reference to a flowchart of FIG. 9. The instruction device 3 may perform steps explained below by sharing the steps with the robot control device 4. However, in the following explanation, as an example, the instruction device 3 performs the steps.

First, the operator inputs, while viewing the display screen 60 of the input device 6 shown in FIG. 8, a setting angle for the robot arm 10, that is, an angle formed by the proximal end face of the robot arm 10 and the horizontal plane. The input is completed by inputting a numerical value to the setting-angle input section 61 and pressing the determination button 62. The operator can accurately input the setting angle by, for example, grasping an inclination angle of the inclined surface 181 of the inclined member 18.

When the operator presses the determination button 62, information concerning the setting angle is input to the instruction device 3 via the input section 34. In step S101, the input section 34 inputs the information concerning the setting angle to, that is, takes the information concerning the setting angle into the storing section 32.

Subsequently, in step S102, a proper servo parameter K0, which is a proper servo parameter at the input setting angle, is calculated. In this step, the proper servo parameter K0 is individually calculated for the respective motors 510 of the driving sections 5A to 5F by the same calculation method. Therefore, one motor 510 is focused and explained.

In this step, the proper servo parameter K0 is calculated based on a first servo parameter K1 corresponding to setting at the first setting angle for the robot arm 10 shown in FIG. 6 and a second servo parameter K2 corresponding to setting at the second setting angle for the robot arm 10 shown in FIG. 7.

In this embodiment, the first setting angle shown in FIG. 6 is 0° and the second setting angle shown in FIG. 7 is 90°. The first servo parameter K1 corresponding to the setting at the first setting angle for the robot arm 10 is an optimum value at the first setting angle. This value is, for example, experimentally calculated in advance and stored in the storing section 32. Similarly, the second servo parameter K2 corresponding to the setting at the second setting angle for the robot arm 10 is an optimum value at the second setting angle. This value is, for example, experimentally calculated in advance and stored in the storing section 32.

In this way, at the first setting angle, an angle formed by a setting surface on which the robot arm 10 is set and the horizontal plane is 0° and, at the second setting angle, the angle formed by the setting surface and the horizontal plane is 90°. Consequently, it is possible to perform more accurate parameter detection as explained below.

The CPU 31 multiplies a difference between the first servo parameter K1 and the second servo parameter K2 by $\sin\theta$ and subtracts a value obtained by the multiplication from the first servo parameter K1. That is, the CPU 31 calculates $K0=K1-(K1-K2)\times\sin\theta$. Consequently, it is possible to accurately calculate the proper servo parameter K0.

More specifically, as explained above, the servo parameter includes the position feedforward gain Kppff, the position control gain Kpp, and the speed control gain Kvp. In this embodiment, respective proper values of the position feedforward gain Kppff, the position control gain Kpp, and the speed control gain Kvp are calculated.

First, the calculation of the proper value of the position feedforward gain Kppff is explained.

When a position feedforward gain in the first servo parameter K1 is represented as Kppff1, a position feedforward gain in the second servo parameter K2 is represented as Kppff2, and a proper value of the position feedforward gain Kppff is represented as Kppff0, the CPU 31 calculates Kppff0=Kppff1-(Kppff1-Kppff2)×sin θ. Consequently, it is possible to accurately calculate the proper value Kppff0 of the position feedforward gain Kppff according to a setting angle θ.

The calculation of the proper value of the position control gain Kpp is explained.

When a position control gain in the first servo parameter K1 is represented as Kpp1, a position control gain in the second servo parameter K2 is represented as Kpp2, and a proper value of the position control gain Kpp is represented as Kpp0, the CPU 31 calculates Kpp0=Kpp1-(Kpp1-Kpp2)×sin θ. Consequently, it is possible to accurately calculate the proper value Kpp0 of the position control gain Kpp according to the setting angle θ.

The calculation of the proper value of the speed control gain Kvp is explained.

When a speed control gain in the first servo parameter K1 is represented as Kvp1, a speed control gain in the second servo parameter K2 is represented as Kvp2, and a proper value of a speed control gain Kvp is represented as Kvp0, the CPU 31 calculates Kvp0=Kvp1-(Kvp1-Kvp2)×sin θ. Consequently, it is possible to accurately calculate the proper value Kvp0 of the speed control gain Kvp according to the setting angle θ.

In this way, in this embodiment, the proper values of the position feedforward gain Kppff, the position control gain Kpp, and the speed control gain Kvp are respectively calculated. Consequently, it is possible to calculate an optimum servo parameter according to the setting angle θ of the robot arm 10.

That is, the servo parameter includes the position feedforward gain, the position control gain, and the speed control gain. In the calculating step, any one of the position feedforward gain, the position control gain, and the speed control gain is calculated, in this embodiment, all the gains are calculated. Consequently, it is possible to calculate an optimum servo parameter according to the setting angle θ of the robot arm 10.

In this way, when the first servo parameter is represented as K1, the second servo parameter is represented as K2, the proper servo parameter, which is the third servo parameter, is represented as K0, and the setting angle for the robot arm 10 is represented as θ, in the calculating step, $K0=K1-(K1-K2)\times\sin\theta$ is calculated. Consequently, it is possible to accurately calculate the proper servo parameter K according to the setting angle θ of the robot arm 10.

Note that, in the explanation in this embodiment, the proper values of the position feedforward gain Kppff, the position control gain Kpp, and the speed control gain Kvp are respectively calculated. However, the present disclosure is not limited to this. The effects of the present disclosure can be obtained if the proper value of at least one of the position feedforward gain Kppff, the position control gain Kpp, and the speed control gain Kvp is calculated.

The proper values of the position feedforward gain Kppff, the position control gain Kpp, and the speed control gain Kvp are calculated for each of the motors 510 of the driving sections 5A to 5F and stored in the storing section 32.

When the optimum, that is, proper force detection parameter in the state shown in FIG. 6 or the state shown in FIG. 7 is used for detection in the state shown in FIG. 1, the force detection parameter is not proper and accuracy of force detection is deteriorated.

Therefore, in this embodiment, in step S103, a proper force detection parameter is calculated according to the setting angle θ. That is, a proper force detection parameter Mx0, which is a proper value of the force detection parameter Mx used for calculation of the force Fx, a proper force detection parameter My0, which is a proper value of the force detection parameter My used for calculation of the force Fy, and a proper force detection parameter Mz0, which is a proper value of the force detection parameter Mz used for calculation of the force Fz, are respectively calculated according to the setting angle θ.

In this step, the proper force detection parameters Mx0, My0, and Mz0 are calculated based on a first force detection parameter corresponding to the setting at the first setting angle for the robot arm 10 shown in FIG. 6 and a second force detection parameter corresponding to the setting at the second setting angle for the robot arm 10.

A first force detection parameter M1 includes a force detection parameter Mx1 used for the calculation of the force Fx, a force detection parameter My1 used for the calculation of the force Fy, and a force detection parameter Mz1 used for the calculation of the force Fz.

A second force detection parameter M2 includes a force detection parameter Mx2 used for the calculation of the force Fx, a force detection parameter My2 used for the calculation of the force Fy, and a force detection parameter Mz2 used for the calculation of the force Fz.

As explained above, the first setting angle shown in FIG. 6 is 0° and the second setting angle shown in FIG. 7 is 90°. The force detection parameters Mx1, My1, and Mz1 corresponding to the force detection at the first setting angle are optimum values at the first setting angle. These values are, for example, experimentally calculated in advance and stored in the storing section 32. Similarly, the force detection parameters Mx2, My2, and Mz2 corresponding to the force detection at the second setting angle are optimum values at the second setting angle. These values are, for example, experimentally calculated in advance and stored in the storing section 32.

The proper force detection parameter Mx0 is calculated as explained below.

The CPU 31 multiplies a difference between the force detection parameter Mx1 and the force detection parameter Mx2 by sin θ and subtracts a value obtained by the multiplication from the force detection parameter Mx1. That is, the CPU 31 calculates Mx0=Mx1-(Mx1-Mx2)×sin θ. Consequently, it is possible to accurately calculate the proper force detection parameter Mx0 according to the setting angle θ. Accordingly, it is possible to accurately perform force detection in the x-axis direction irrespective of the setting angle θ.

The proper force detection parameter My0 is calculated as explained below.

The CPU 31 multiplies a difference between the force detection parameter My1 and the force detection parameter My2 by sin θ and subtracts a value obtained by the multiplication from the force detection parameter My1. That is, the CPU 31 calculates My0=My1−(My1−My2)×sin θ. Consequently, it is possible to accurately calculate the proper force detection parameter My0 according to the setting angle θ. Accordingly, it is possible to accurately perform force detection in the y-axis direction irrespective of the setting angle θ.

The proper force detection parameter Mz0 is calculated as explained below.

The CPU 31 multiplies a difference between the force detection parameter Mz1 and the force detection parameter Mz2 by sin θ and subtracts a value obtained by the multiplication from the force detection parameter Mz1. That is, the CPU 31 calculates Mz0=Mz1−(Mz1−Mz2)×sin θ. Consequently, it is possible to accurately calculate the proper force detection parameter Mz0 according to the setting angle θ. Accordingly it is possible to accurately perform force detection in the z-axis direction irrespective of the setting angle θ.

The proper force detection parameter Mx0, the proper force detection parameter My0, and the proper force detection parameter Mz0 obtained in this way are stored in the storing section 32.

The proper values of the position feedforward gain Kppff, the position control gain Kpp, and the speed control gain Kvp, the proper force detection parameter Mx0, the proper force detection parameter My0, and the proper force detection parameter Mz0 are calculated through the steps explained above.

Step S102 and step S103 are not limited to be performed in the order explained above and may be simultaneously performed or may be performed in the opposite order. Step S103 may be omitted.

Although not illustrated, the instruction device 3 transmits information concerning the proper values of the position feedforward gain Kppff, the position control gain Kpp, and the speed control gain Kvp calculated in step S102 to the robot control device 4. The robot control device 4 performs the control of the operation of the robot arm 10 using the received proper values of the position feedforward gain Kppff, the position control gain Kpp, and the speed control gain Kvp. Consequently, position accuracy and responsiveness of the control of the operation of the robot arm 10 are improved. The robot 1 can exert excellent performance. As a result, the robot 1 can quickly and accurately perform work.

Although not illustrated, the instruction device transmits information concerning the proper force detection parameter Mx0, the proper force detection parameter My0, and the proper force detection parameter Mz0 calculated in step S103 to the robot control device 4. The robot control device 4 performs force detection using the proper force detection parameter Mx0, the proper force detection parameter My0, and the proper force detection parameter Mz0 received from the instruction device 3. Consequently, force applied to the robot arm 10 can be accurately detected. Work can be safely and accurately performed.

A synergistic effect of these effects can be obtained by performing both of step S102 and step S103. That is, with a synergistic effect of the calculation of the proper values of the position feedforward gain Kppff, the position control gain Kpp, and the speed control gain Kvp and the calculation of the proper force detection parameter Mx0, the proper force detection parameter My0, and the proper force detection parameter Mz0, the position accuracy and the responsiveness of the control of the operation of the robot arm 10 are further improved. The robot 1 can exert performance more excellent in safety.

In the calculation in step S102 and step S103, the information concerning the setting angle θ input in step S101 is shared. That is, step S102 and step S103 are executed based on the information concerning the setting angle θ input once in step S101. Consequently, it is possible to calculate a proper parameter with a simpler method.

In this embodiment, in step S101, the numerical value of the setting angle is directly input as an example of the information concerning the setting angle. However, the present disclosure is not limited to this. The numerical value of the setting angle may be selected out of a plurality of choices. The plurality of choices may be numerical values such as "10°", "20°", and "30°", may be characters such as "inclination angle is small", "inclination angle is medium", and "inclination angle is large", or may be signs indicating the magnitude of the inclination angle.

In the explanation in this embodiment, the first setting angle shown in FIG. 6 is 0° and the second setting angle shown in FIG. 7 is 90°. However, the present disclosure is not limited to this. The first setting angle and the second setting angle may be respectively any angles if the first setting angle and the second setting angle are different from each other.

As explained above, a control method according to the first embodiment of the present disclosure includes an input step for inputting the information concerning the setting angle for the robot arm 10 of the robot 1, the robot 1 including the robot arm 10 including the arms 11 to 16 and the driving sections 5A to 5F including the motors 510, which are servomotors that drive the arms 11 to 16, and a calculating step for calculating, based on the first servo parameter corresponding to the setting at the first setting angle for the robot arm 10 and the second servo parameter corresponding to the setting at the second setting angle different from the first setting angle for the robot arm 10, the proper servo parameter, which is the third servo parameter corresponding to the setting angle for the robot arm 10. Consequently, it is possible to calculate the proper servo parameter according to the setting angle for the robot arm 10. Accordingly, the position accuracy and the responsiveness of the control of the operation of the robot arm 10 are improved irrespective of the setting angle. The robot 1 can exert excellent performance. As a result, the robot 1 can quickly and accurately perform work.

The calculation device 9 according to the first embodiment of the present disclosure includes the input section 34 that inputs the information concerning the setting angle for the robot arm 10 of the robot 1, the robot 1 including the robot arm 10 including the arms 11 to 16 and the driving sections 5A to 5F including the motors 510, which are the servomotors that drive the arms 11 to 16, and the CPU 31 functioning as a calculating section that calculates, based on the first servo parameter corresponding to the setting at the first setting angle for the robot arm and the second servo parameter corresponding to the setting at the second setting angle different from the first setting angle for the robot arm 10, the proper servo parameter, which is the third servo parameter corresponding to the setting angle for the robot arm 10. Consequently, it is possible to calculate the proper servo parameter according to the setting angle for the robot arm 10. Accordingly, the position accuracy and the responsiveness of the control of the operation of the robot arm 10 are improved irrespective of the setting angle. The robot 1 can exert excellent performance. As a result, the robot 1 can quickly and accurately perform work.

Second Embodiment

Figure 10:
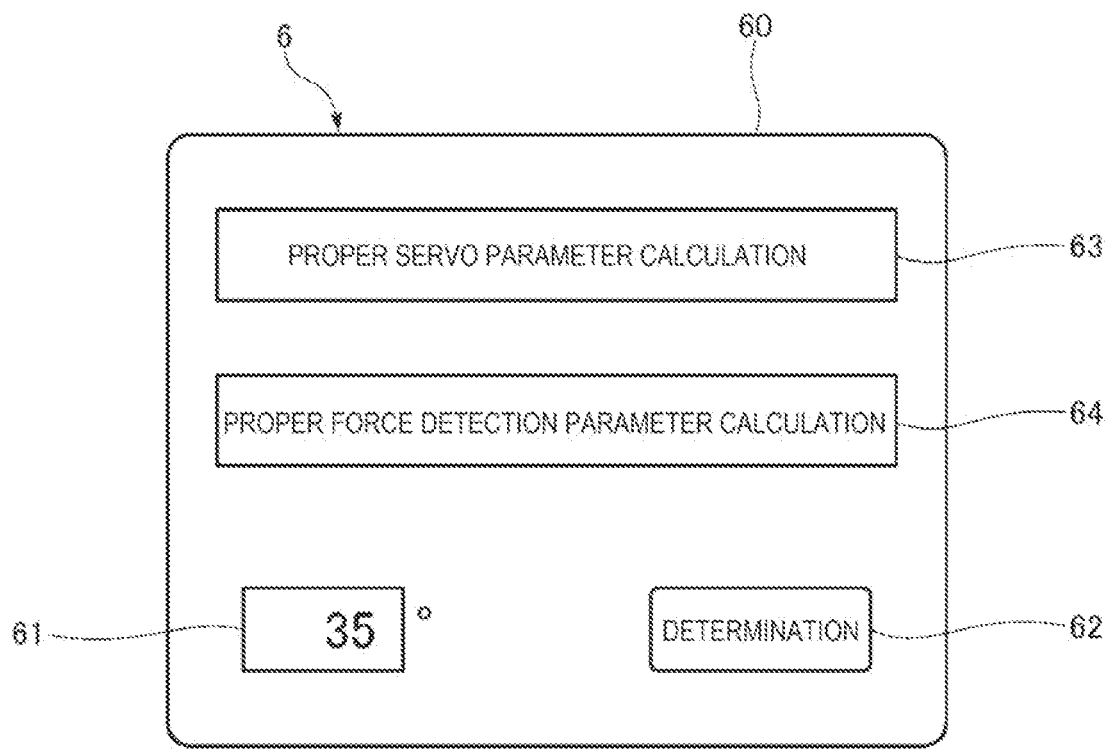
FIG. 10 is a diagram showing a display screen of an input device of a calculation device according to a second embodiment of the present disclosure.
Figure 11:
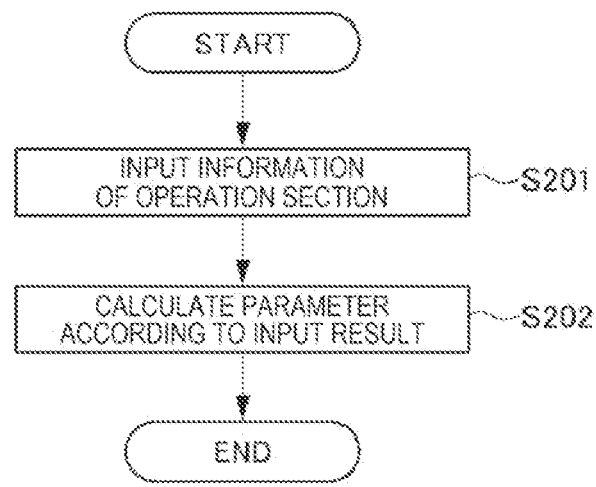
FIG. 11 is a flowchart for explaining a control operation performed by the calculation device according to the second embodiment of the present disclosure.

FIG. 10 is a diagram showing a display screen of an input device of a calculation device according to a second embodiment of the present disclosure. FIG. 11 is a flowchart for explaining a control operation performed by the calculation device according to the second embodiment of the present disclosure.

The second embodiment is explained below. In the following explanation, differences from the first embodiment are mainly explained. Explanation about similarities to the first embodiment is omitted.

As shown in FIG. 10, a proper servo parameter calculation button 63 and a proper force detection parameter calculation button 64 are displayed on the display screen 60 of the input device 6 according to this embodiment in addition to the setting-angle input section 61 and the determination button 62.

The proper servo parameter calculation button 63 is a button for selecting whether to calculate a proper servo parameter. The proper force detection parameter calculation button 64 is a button for selecting whether to calculate a proper force detection parameter.

An operator selects and presses at least one of the proper servo parameter calculation button 63 and the proper force detection parameter calculation button 64, inputs a setting angle to the setting-angle input section 61, and thereafter presses the determination button 62. That is, the operator is capable of selecting which parameter of the proper servo parameter and the proper force detection parameter is calculated. Consequently, the operator can omit calculation of an unnecessary parameter according to the configuration of the robot 1 and work content. Accordingly, the control operation of the instruction device 3 can be simplified.

The control operation of the instruction device 3 is explained with reference to a flowchart of FIG. 11.

First, the operator presses at least one of the proper servo parameter calculation button 63 and the proper force detection parameter calculation button 64 and inputs a setting angle for the robot arm 10 to the setting-angle input section 61 while viewing the display screen 60 of the input device 6 shown in FIG. 10.

When the operator presses the determination button 62, information concerning which parameter is calculated and information concerning the setting angle are input to the instruction device 3 via the input section 34 shown in FIG. 2. In step S201, the input section 34 inputs the information concerning the setting angle to, that is, takes the information concerning the setting angle into the storing section 32.

Subsequently, in step S202, at least one of the proper servo parameter and the proper force detection parameter is calculated based on an input result in step S201.

These calculation methods are the same as the calculation methods in the first embodiment. Therefore, explanation about the calculation methods is omitted.

In this way, the calculation device 9 includes the input section 34 that inputs the information concerning the setting angle for the robot arm 10 of the robot 1, the robot 1 including the robot arm 10 including the arms 11 to 16 and the driving sections 5A to 5F including the motors 510, which are the servomotors that drive the arms 11 to 16, and the CPU 31 functioning as a calculating section that calculates, according to an input result of the input section 34, at least one of a servo parameter used in driving the motors 510 and a force detection parameter used for correction of a detection value of the force detection section 5. Consequently, it is possible to selectively calculate at least one of a servo parameter and a force detection parameter according to the setting angle for the robot arm 10. Accordingly, the robot 1 can quickly and accurately perform work irrespective of the setting angle.

The control methods and the calculation devices according to the embodiments of the present disclosure are explained. However, the present disclosure is not limited to this. The components of the sections of the calculation devices can be replaced with any structures having the same functions. Any other structures may be added. The steps of the control methods can be replaced with any steps that exert the same effects. Any other steps may be added.

In the embodiments, the input device 6 inputs the setting angle θ to the input section 34. However, the present disclosure is not limited to this. For example, an angle detecting section may detect the setting angle θ. That is, the robot 1 may include the angle detecting section and may be configured to calculate the proper servo parameter based on a detection result of the angle detecting section.

In the embodiments, the number of rotation axes of the robot arm is six. However, the present disclosure is not limited to this. The number of rotation axes of the robot arm may be, for example, one to five or seven or more. That is, in the embodiments, the number of arms is six. However, the present disclosure is not limited to this. The number of arms may be one to five or may be seven or more.

What is claimed is:
1. A control method comprising:
a receiving step for receiving a setting angle for a robot arm of a robot to save the received setting angle into a memory, the robot including a part that is configured to adjust a value of the setting angle, the robot arm including a driving section, the driving section including a servomotor, the servomotor being configured to drive the robot arm;
a calculating step for calculating a third servo parameter corresponding to the setting angle based on a first servo parameter corresponding to setting the robot arm at a first setting angle and a second servo parameter corresponding to setting the robot arm at a second setting angle, the second setting angle being different from the first setting angle; and
a controlling step for controlling the servomotor to move the robot arm based on the third servo parameter.
2. The control method according to claim 1, wherein
in the calculating step, $K0=K1-(K1-K2)\times\sin\theta$ is calculated wherein the first servo parameter is represented as K1, the second servo parameter is represented as K2, the third servo parameter is represented as K0, and the setting angle for the robot arm is represented as θ.
3. The control method according to claim 1, wherein
each of the first to third servo parameters includes a position feedforward gain, a position control gain, and a speed control gain, and
in the calculating step, any one of the position feedforward gain, the position control gain, and the speed control gain is calculated.
4. The control method according to claim 1, wherein
the first setting angle, formed by a setting surface on which the robot arm is set and a horizontal plane, is 0°, and
the second setting angle, formed by the setting surface and the horizontal plane, is 90°.

5. A robot system comprising:
a robot arm including a servomotor, the servomotor being configured to drive the robot arm; and
one or more processors configured to:
  receive a setting angle for the robot arm of a robot to save the received setting angle into a memory, wherein the robot including a part that is configured to adjust a value of the setting angle;
  calculate a third servo parameter corresponding to the setting angle based on a first servo parameter corresponding to setting the robot arm at a first setting angle and a second servo parameter corresponding to setting the robot arm at a second setting angle, the second setting angle being different from the first setting angle; and
  control the servomotor to move the robot arm based on the third servo parameter.

6. A control method comprising:
a displaying step for displaying a screen including a setting-angle input section on a display screen;
an accepting step for accepting an operation to input information concerning a setting angle for a robot arm of a robot via the setting-angle input section by an operator, the robot arm including a driving section, the driving section including a servomotor, the servomotor being configured to drive the robot arm;
a calculating step for calculating a third servo parameter corresponding to the setting angle based on a first servo parameter corresponding to setting the robot arm at a first setting angle and a second servo parameter corresponding to setting the robot arm at a second setting angle, the second setting angle being different from the first setting angle; and
a controlling step for controlling the servomotor to move the robot arm based on the third servo parameter.

7. The control method according to claim 6, wherein
in the calculating step, $K0=K1-(K1-K2)\times\sin\theta$ is calculated wherein the first servo parameter is represented as $K1$, the second servo parameter is represented as $K2$, the third servo parameter is represented as $K0$, and the setting angle for the robot arm is represented as $\theta$.

8. The control method according to claim 6, wherein
each of the first to third servo parameters includes a position feedforward gain, a position control gain, and a speed control gain, and
in the calculating step, any one of the position feedforward gain, the position control gain, and the speed control gain is calculated.

9. The control method according to claim 6, wherein
the first setting angle, formed by a setting surface on which the robot arm is set and a horizontal plane, is 0°, and
the second setting angle, formed by the setting surface and the horizontal plane, is 90°.

* * * * *